United States Patent [19]

Pertzsch et al.

[11] Patent Number: 4,564,120
[45] Date of Patent: Jan. 14, 1986

[54] MAGNETIC TAPE CASSETTE

[75] Inventors: Albert Pertzsch; August Liepold, both of Munich; Hubert Brunner, Weil; Ludwig Zeroni, Ottobrunn, all of Fed. Rep. of Germany

[73] Assignee: Agfa-Gevaert Aktiengesellschaft, Leverkusen, Fed. Rep. of Germany

[21] Appl. No.: 641,598

[22] Filed: Aug. 17, 1984

[30] Foreign Application Priority Data

Aug. 30, 1983 [DE] Fed. Rep. of Germany ....... 3331258

[51] Int. Cl.⁴ ...................... B65D 43/14; B65D 51/04
[52] U.S. Cl. .................................. 220/337; 206/387; 242/198; 242/199; 360/132
[58] Field of Search ............... 220/337, 334; 206/387; 242/198, 199, 200, 197; 360/132

[56] References Cited

U.S. PATENT DOCUMENTS

| 4,212,437 | 3/1980 | Shiba et al. | 242/199 |
| 4,418,373 | 11/1983 | Fujimori et al. | 360/132 |
| 4,449,677 | 5/1984 | Ohta et al. | 242/199 |
| 4,476,505 | 10/1984 | Victor | 360/94 |
| 4,485,988 | 12/1984 | Kikuya et al. | 206/387 |

FOREIGN PATENT DOCUMENTS

| 78696 | 11/1982 | European Pat. Off. . |
| 90573 | 3/1983 | European Pat. Off. . |
| 97964 | 6/1983 | European Pat. Off. . |
| 2508223 | of 0000 | European Pat. Off. . |
| 3302392 | of 0000 | European Pat. Off. . |
| 2837887 | of 0000 | Fed. Rep. of Germany . |
| 3150317 | of 0000 | Fed. Rep. of Germany . |
| 3201642 | of 0000 | Fed. Rep. of Germany . |

Primary Examiner—George T. Hall
Attorney, Agent, or Firm—Connolly and Hutz

[57] ABSTRACT

Magnetic tape cassette for magnetic recording and play-back devices with pivotal front lid whereby the front lid is biassed by a two-armed safety bar which may be moved forwards and backwards, the swivel range of which is restricted by a pin on the inside of the front lid, characterized in that the two-armed safety bar 19 extends beyond its bearing journal 22, and the extension in the closed position of the front lid serves as a stop 25 on the wall 27, positioned behind, on the upper part of the cassette, and an U-shaped leaf spring 28 is provided to bias the safety bolt between the back wall of the safety bar bearing 18 and the adjacent safety bar arm 21.

4 Claims, 2 Drawing Figures

MAGNETIC TAPE CASSETTE

This invention relates to a magnetic tape cassette comprising a substantially rectangular, two-part housing which has upper and lower parallel main walls, each with three side walls, and an opening along the front of the housing, along which the tape passes from two plane-parallel positioned reels, and a pivotally mounted front lid which releases or closes the opening and comprises an outer cover and an inner cover by which the tape is enclosed when the front flap is in its closed position. This lid also has a lock to prevent unintentional opening. The cassette is suitable for magnetic recording and play-back devices, for example for video tape recorders.

Tape cassettes known hitherto for video recorders have on the front an open tape guidance system with a recessed region located behind, in the lower part of the cassette. When the cassette is introduced into the opening of a video recorder, the tape guiding member is introduced into this region. For external protection, these cassettes have a pivotal front lid which partly or completely covers the front of the cassette. However, during operation, due to the recesses, the cassettes are not protected against dust, so that dust may settle on the tapes which results in so-called signal interruptions. Although in a more recent type of tape cassette, the recess is still in the lower part of the cassette when loading the cassette into the video recorder, the tape, when out of operation, is protected by a front lid comprising an inner and outer cover between which the tape is firmly held in the closed position of the lid. Consequently, dust is prevented from adhereing to the tape, and the tape is also prevented from being damaged. A cassette of this type and the front lid mechanism thereof are described in, for example, DE-OS No. 3,223,279 and 3,302,392. The front lid is attached and made to pivot in the vertical direction by means of two holes in the left-hand and right-hand ends parts of the side walls of the lower part of the cassette in which two pins on the side walls of the front lid engage. A torsion spring which sits on one of the pins is used to move the front flap in a vertical direction or to press it in an anti-clockwise direction. One end of the spring may rest on a peg in the side wall of the front lid, while the other end strikes against a projection of the side wall of the upper part of the cassette (FIGS. 4 and 5 of DE-OS No. 3,302,392). In the German application of the Applicant of 22.08.83, Ser. No. P 33 31 160.9-53 for biassing purposes, a lid sprial spring is used which has a bracket arm which rests in a groove in the front end of the upper part of the cassette. A fitting of this type of the cassette not only allows a simple assembly, but avoids a possible blocking of the front flap during the pivoting movement, in view of the limited space between the front lid and the front end of the upper part of the cassette. Cassettes of this type also have a front lid lock to prevent the flap being opened in its closed position. Locking mechanisms of this type are described in, for example DE-OS No. 3,150,317 and 3,223,279. In the first-mentioned publication, the front lid is unlocked from outside by means of a sprung blocking element with a nose. In the second-mentioned publication, the cassette housing contains on the lateral end regions leaf spring parts with safety catches consisting of plastics and which catch into locking holes in the closed position of the front flap. To unlock the lid, projections on the cassette holding device press the leaf spring parts away to such an extent that the safety catches may be released from the locking holes. Moreover, proposals have been made for a locking mechanism for cassettes, in particular for video cassettes, which mechanism has on the front section of a side wall of the lower part of the cassette a bearing which is sealed on three sides for receiving a two-armed safety bar, the arms of which are at an angle of about 45° to one another. The safety bar is attached so that it may pivot by means of a bearing journal. The arms of the safety bar may support a nose on their free end pointing towards the front lid. On the corresponding inside of the side part of the front lid there is a locking journal, behind which the nose of the safety bar arm engages when the front flap is in its closed position. A spring is used to bias the safety catch and it applies a pressure from the back wall of the safety catch bearing or from the opposite wall of the upper part of the cassette. The biassing spring may be, for example, the second arm of a torsion spring used for biasing, the front lid.

The known constructions of the front lid lock suffer from the disadvantage that either very expensive mounting aids are required for the assembly, and/or a perfect transition of the lock from the open position of the front lid into the closed position is not provided.

In order to overcome these disadvantages, the present invention provides a magnetic tape cassette comprising a substantially rectangular, two-part housing which has an upper main wall and a lower main wall, each with three side walls, and an opening along its front side, along which the magnetic tape is transported from two plane-parallel reels, and is also enclosed by a pivotal front-lid which partly overlaps the side walls, the front lid being biassed by means of torsion springs and being locked by a two-armed safety bar which may be moved backwards and forwards and is positioned on one side of the lower part of the cassette, the pivoting range of which is restricted by a pin on the inside of the side part of the front lid, the two-armed safety bar 19 extending beyond its bearing journal 22 and the extension serving as a stop 25 on the wall 27, located behind, of the upper part of the cassette in the closed position of the front lid, and a U-shaped leaf spring 28 is provided to bias the safety bar between the back wall of the safety bar bearing 18 and the adjacent safety bar arm 21.

The present invention will now be described in more detail with reference to the accompanying drawings.

Figure 1:
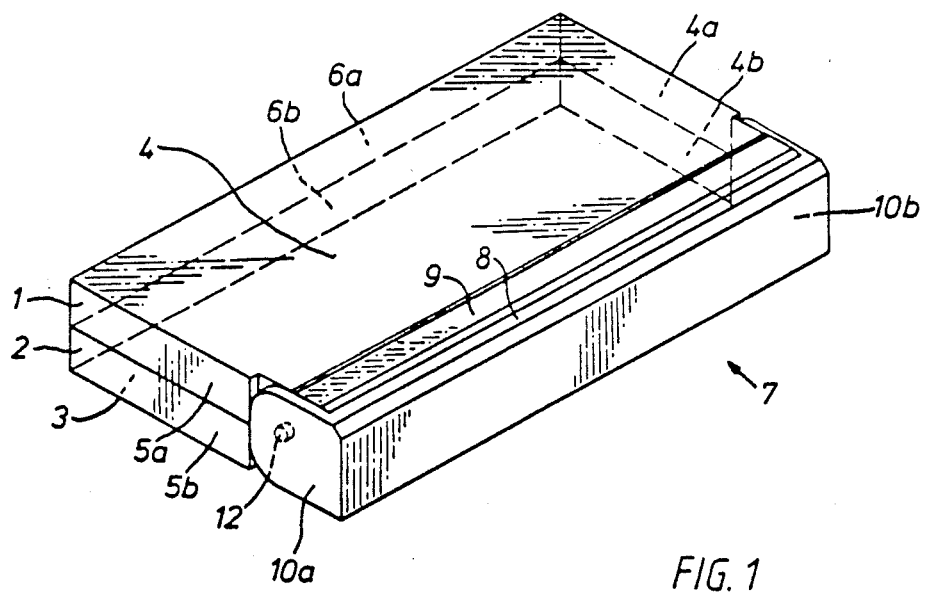
FIG. 1 shows a perspective view of a tape cassette.

FIG. 1 shows a magnetic tape cassette of the initially described type comprising an upper part 1 and a lower part 2 with an upper main wall 4 and a lower main wall 3, each with three side walls 4a, 4b, 5a, 5b, 6a, 6b. Two plane-parallel positioned tape reels are located in the cassette, as is known for other types of cassette, between which the magnetic tape passes on the front of the cassette housing and is wound and unwound. The arrangement of the tape reels and of the magnetic tape in the cassette is shown in detail in FIGS. 5 and 6 of DE-OS No. 3,223,279. The front of the cassette contains a front lid 7 having an outer cover 8 and an inner cover 9 and side parts 10a, 10b which partly overlap the side walls of the cassette housing. When the front lid is closed, the magnetic tape is sealed in between the two covers and is thus protected from possible damage. In the front left-hand and right-hand sections of the upper part of the cassette according to FIG. 2, there are two holes 11 and, on the inside of each of the left-hand and right-hand side parts of the front lid, there is a pivot pin 12 which is mounted in each and thus make it possible for the front lid to pivot. In order to obtain a corresponding bias of the front lid, a single-armed flat spiral spring 13 is used, for example, which sits on at least one of the pivot pins 12. The spring 13 is attached in a particularly simple manner by bending round the inner end 14 of the spring and introducing it into a slit 15 in the pivot pin. The bracket arm 16 of the spiral spring runs along the inside of the side part of the front lid up to the inside of the outer cover. When the individual parts of the cassette are assembled, namely the front lid and the upper part of the cassette, the spiral spring is automatically positioned in a groove 17 on the outside of the upper part of the cassette, and it ensures the bias of the front lid in the closed position. Behind the side part of the front lid 10b, there is located on the corresponding side in the lower part of the cassette the bearing for the front lid lock, comprising a known U-shaped wall 18. It accommodates the safety bar 19 with its two arms 20a and 20b, 21a and 21b at an angle of about 45° for one another, the bar 19 being mounted pivotally on a pin 22. A locking pin 23 which restricts the swivelling range of the safety bar sits on the inside of the side part of the front lid. In the closed position of the front lid, the front safety bar arm lies with its nose 24 on the pin 23. Once the cassette has been loaded into a tape player, the other safety bar arm 21a is pushed backwards 21b by an actuating element 26, and the front lid is unlocked or is released into the open position. According to the present invention, the safety bar extends beyond the bearing journal. This extended arm 25 lies, in the closed position of the front lid, on the wall 27 of the upper part of the cassette located above the safety bar bearing.

Figure 2:
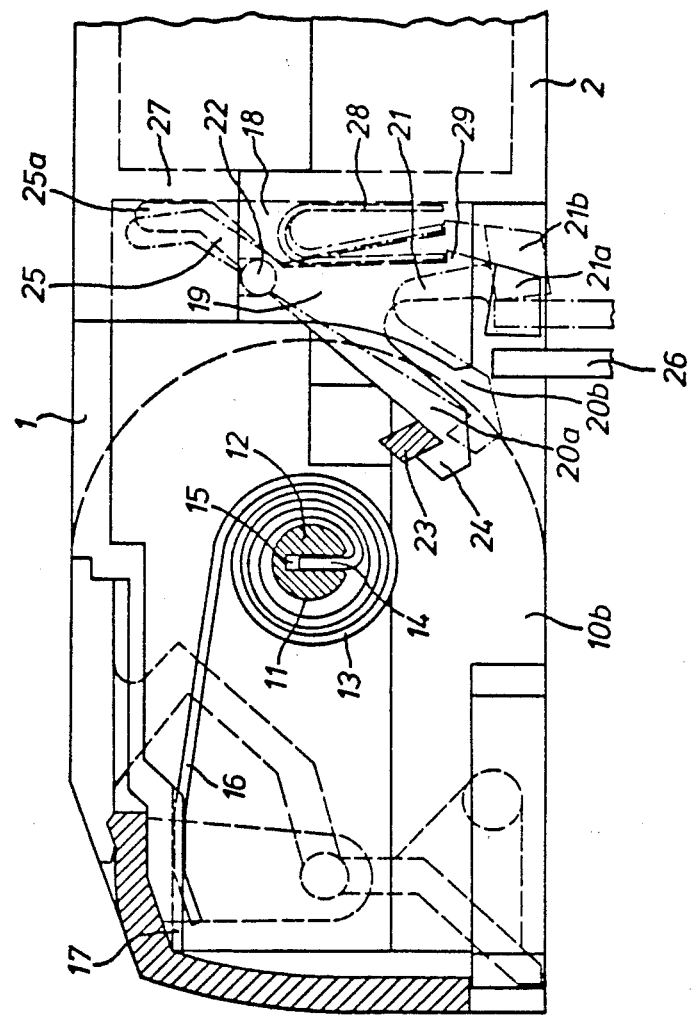
FIG. 2 shows a section through the front lid with the lock according to the present invention.

As shown in FIG. 2, this arm may be angled, in which case only the angled part 25a lies on the back wall of the upper part of the cassette. This shape promotes the mounting of the safety bar arm in the bearing, because the arm is easily caught by an assembly element and may be inserted when said element is positioned upright. It may also have another shape, for example it may be straight and it may have a bevel on its free end by which it lies on the above-mentioned back wall in the closed position. This design of the safety bar stop prevents it from slipping with its front arm over the locking pin during the swivelling out of the open position into the closed position of the front lid, and consequently prevents the front lid from being able to open accidentally. Moreover, in such a case, the opening procedure of the front lid is hindered with a successive loading of the cassette, because when a safety bar is used without an extended arm, during the closing procedure, the locking pin thereof comes to lie between the two safety bar arms. As already mentioned, in the case of successive loading, this would put the locking mechanism out of operation. FIG. 2 shows the locked position of the safety bar. The unlocked position is shown in dash-dotted lines. In order to give the safety bar the corresponding bias which holds the bar in the locked position, a U-shaped leaf spring 28 is used positioned between the back wall 18 of the lower part of the cassette and the adjacent safety bar arm 21. This leaf spring may consist of plastics or metal. It is prevented from falling out of the cassette by a projection 29 on the back of the adjacent bar arm. Furthermore, the spring cannot fall into the free space of the cassette upper part during assembly, since this is prevented by the part of the bar which is designed as a stop. A particular advantage of the leaf spring designed in this manner, apart from the intrinsically simple assembly, is the fact that this spring may also be inserted from the bottom of the lower part of the cassette, once the complete cassette has been assembled.

We claim:

1. A magnetic tape cassette for magnetic recording and play-back devices comprising a substantially rectangular, two-part housing comprised of an upper part which has an upper main wall and a lower part which has a lower main wall, each part with three side walls, and an opening along a front side of the cassette, along which a magnetic tape is transportable from two plane-parallel-positioned reels, and a pivotal front lid mounted on said housing which partly overlaps the side walls and which releases and closes said opening and comprises an outer cover and an inner cover positioned intermediate said outer cover and said upper part, by which the magnetic tape is enclosable in the closed position of said front lid, the front lid being biassed by a two-armed safety bar which may be moved backwards and forwards and is positioned on one side of the lower part of the cassette, the swivel range of which is restricted by a pin on the inside of the side part of the front lid, characterised in that the two-armed safety bar extends beyond its bearing journal, and the extension in the closed position of the front lid serves as a stop on the wall, positioned behind, on the upper part of the cassette, and a U-shaped leaf spring is provided to bias the safety bolt between the back wall of the safety bar bearing and the adjacent safety bar arm.

2. A magnetic tape cassette according to claim 1, characterised in that a projection 29 is provided on the back of the safety bar adjacent to the leaf spring.

3. A magnetic tape cassette according to claim 1, characterised in that the extended arm 25 of the safety bar is bent, and the end of which, projecting into the upper part of the cassette, serves as a stop.

4. A magnetic tape cassette according to claim 1, characterised in that the extended arm of the safety bar is formed in a straight line in order to serve as a stop.

* * * * *